(12) United States Patent
Joham et al.

(10) Patent No.: US 7,039,442 B1
(45) Date of Patent: May 2, 2006

(54) BEAM SHAPING METHOD FOR THE DOWNLINK FOR BASE STATIONS IN RADIO COMMUNICATION SYSTEMS

(75) Inventors: Michael Joham, Munich (DE); Josef Nossek, Iffeldorf (DE); Wolfgang Utschick, Ingolstadt (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/958,841

(22) PCT Filed: Apr. 11, 2000

(86) PCT No.: PCT/DE00/01119

§ 371 (c)(1),
(2), (4) Date: Dec. 5, 2001

(87) PCT Pub. No.: WO00/62444

PCT Pub. Date: Oct. 19, 2000

(30) Foreign Application Priority Data

Apr. 14, 1999 (DE) ................................ 199 16 912

(51) Int. Cl.
*H04M 1/00* (2006.01)

(52) U.S. Cl. ................ 455/562.1; 455/561; 455/456.6; 455/553.1; 370/335; 370/342; 370/441

(58) Field of Classification Search ............. 455/562.1, 455/561, 456.5, 456.6, 525, 526, 73, 550.1, 455/553.1, 556.1, 556.2; 370/335, 342, 441, 370/334
See application file for complete search history.

(56) References Cited

U.S. PATENT DOCUMENTS 6,101,399 A * 8/2000 Raleigh et al. ............. 455/561

FOREIGN PATENT DOCUMENTS

| DE | 197 13 666 | 10/1998 |
|----|-----------|---------|
| EP | 866 568 | 9/1998 |
| EP | 899 896 | 3/1999 |
| WO | 97/00543 | 1/1997 |
| WO | 98/37638 | 8/1998 |
| WO | 99/14870 | 3/1999 |

OTHER PUBLICATIONS

C. Brunner, et al., "Downlink Beamforming for WCDMA Based on Uplink Channel Parameters", EPMCC, 1999, pp. 375-380.

* cited by examiner

*Primary Examiner*—Melur Ramakrishnaiah
(74) *Attorney, Agent, or Firm*—Staas & Halsey LLP

(57) ABSTRACT

According to the invention, a base station has an antenna device with a plurality of antenna elements and is connected to a subscriber station via a radio interface. The direction of incidence, the attenuation and the delay times of connection paths used for beam forming for signal sections for channel estimation purposes are determined from the transmissions of the other radio station in a known manner. The beam-forming vector for the transmit signal is constant during these signal sections for channel estimation purposes, for which the radio station can estimate a reception characteristic of the other radio station. Outside the signal sections for channel estimation, a symbol-specific beam-forming vector is determined which takes into account variable symbol-related properties of the transmit signal (for example correlation properties of CDMA codes) which are not constant during a time slot but rather vary from symbol to symbol.

12 Claims, 1 Drawing Sheet

BEAM SHAPING METHOD FOR THE DOWNLINK FOR BASE STATIONS IN RADIO COMMUNICATION SYSTEMS

BACKGROUND OF THE INVENTION

1. Field of the Invention

The invention relates to a method and to a base station for forming beams for the transmit direction, in particular in radio communications systems with CDMA transmission.

2. Description of the Related Art

In radio communications systems, telecommunications (for example voice, image information or other data) are transmitted as signals using electromagnetic waves over a radio interface. The radio interface refers to a link between a base station and subscriber stations, and the subscriber stations can be mobile stations or fixed radio stations. The electromagnetic waves are emitted here with carrier frequencies which lie in the frequency band provided for the respective system. For future radio communications systems, for example the UMTS (Universal Mobile Telecommunication System) or other 3rd generation systems, frequencies in the frequency band of approximately 2000 MHz are provided.

In communications systems, for example mobile radio networks or cordless local loop systems, methods of spatial subscriber separation are known, for example from DE 197 13 666. In such SDMA (Space Division Multiple Access) systems, a plurality of communications links can be supplied in one common channel, the channel being described by a frequency band and possibly a time slot or a spread code in SDMA/TDMA (time division multiple access) or SDMA/CDMA (code division multiple access) systems. For this purpose, adaptive antenna devices with a plurality of antenna elements are used at the transmit end, for example in base stations of mobile radio networks. By these adaptive antennas it is possible to form, by beam forming, a plurality of radiation lobes which are matched to the respective positions of the receiving radio station, for example mobile stations of mobile radio networks. By these radiation lobes which are independent of one another, the spatial resolution, which is used to separate subscriber signals, is achieved.

The transmission path from a base station to a mobile station is referred to as a downlink, and the transmission path from a mobile station of a base station is referred to as an uplink. The spatial subscriber separation by beam forming is generally used for the downlink.

The spectral efficiency of the downlink will play a significant role for future radio communications systems because a larger number of services have an asymmetrical traffic volume in favor of the downlink. Transmission methods with adaptive antennas can increase the spectral efficiency, because, for example in DS-CDMA (direct sequence CDMA), it is possible to reduce the influence of the near/far effect. In known methods for beam forming, see C. Brunner, M. Joham, W. Utschick, M. Haardt, J. A. Nossek, "Downlink Beam-forming for WCDMA based on Uplink Channel Parameters", Proc. Third European Personal Mobile Communications Conference, 1999, it has been assumed that the transmit signal of the base station has constant properties over a certain time period—one time slot. The optimization of the beam-forming relates here to a maximization of the signal-to-noise ratio for a link.

SUMMARY OF THE INVENTION

The invention is based on the object for specifying a method and a base station which improve beam-forming even with transmit signals with non-ideal properties.

According to the invention, a radio station, for example a base station, has an antenna device with a plurality of antenna elements and is connected to another radio station, for example a subscriber station, via a radio interface. The direction of incidence, the attenuation and the delay times of connection paths which are used for beam forming for signal sections of channel estimation purposes at the other station are determined from the transmissions of the other radio station in a known manner. During the signal sections for channel estimation purposes for which the radio station can estimate a reception behavior of the further radio station, the beam-forming vector for the transmit signal is constant.

Outside the signal sections for channel estimation, a symbol-related beam-forming vector is determined for a symbol or for a symbol group, the beam-forming vector taking into account variable, symbol-related properties of the transmit signal. These symbol-related properties are, for example, correlation properties of spread codes which are not constant during a time slot, but rather vary from symbol to symbol. The solution according to the invention has recognized this previous inadequacy and proposes a solution which matches the beam-forming vector in a symbol-related fashion. The method simultaneously also calculates inherently the beam-forming vectors for a plurality of further radio stations if information is available for them.

Furthermore, the invention is based on knowledge of the reception characteristic of the other radio station during the channel estimation. For this, the beam-forming vector is kept constant. If the reception characteristic was not estimated, there would be an unknown degree of freedom and the equation system on which the symbol-related beam-forming optimization is based would be impossible to solve. In order to permit the equation system for the beam formation to be solved, the radio station anticipates which weightings of the RAKE fingers have been set by the other radio station during the signal sections for channel estimation. As result of the beam formation, the decision values of the RAKE demodulator of the other radio station are to be optimized for the sake of satisfactory detectability.

The reception characteristic is influenced by the known variables comprising transmit power, beam-forming vector and properties of the antenna device. A further influencing variable is the individual phase delays of the connection paths between the radio stations. The phase information is either transmitted by the other radio station, so that a very precise setting process is obtained, or optimization methods are used without transmission of the phase information, which methods either aim at taking into account the power of the received signals or a "worst case". Further advantageous designs of the invention are given in the form of the exemplary embodiments.

The invention is explained in more detail below with reference to exemplary embodiments.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENTS

Figure 1:
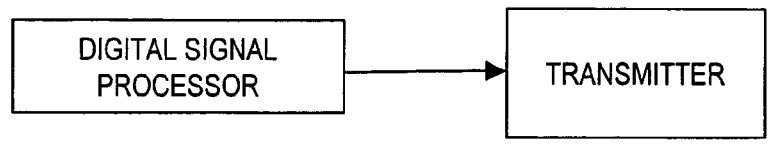
FIG. 1 is a block diagram of a base station according to an aspect of the present invention.
Figure 2:
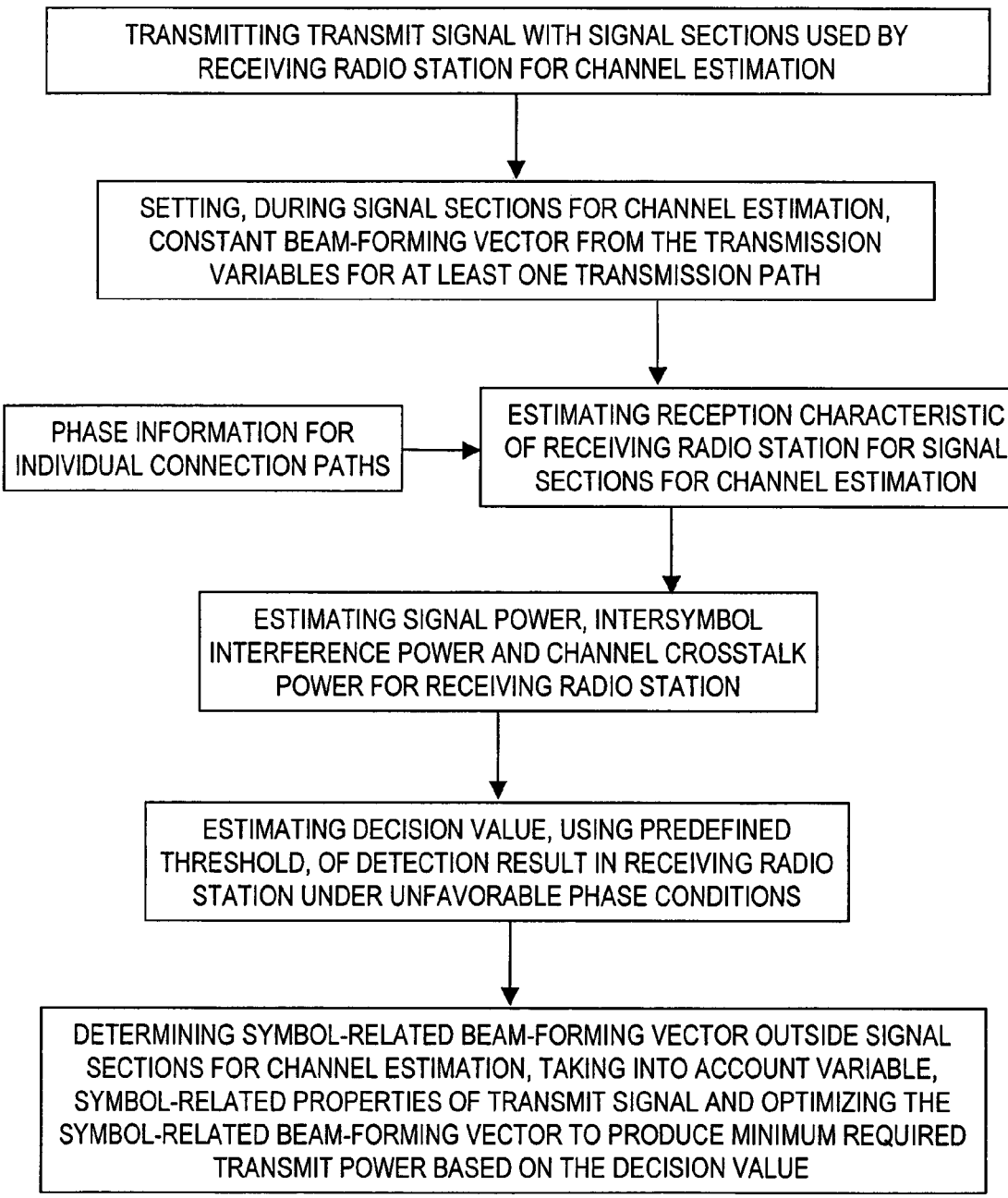
FIG. 2 is a flowchart of a method according to an aspect of the present invention.

Signal Model:

A radio interface with WCDMA (wideband CDMA) transmission is used as the basis, the transmission being provided by the ETSI (European Telecommunications Standardization Institute) for a FDD (frequency division duplex) mode. A transmit signal of a base station in the downlink to the other radio stations, for example subscriber stations k $\in \{1, \ldots, K\}$ can be given as $$s_k(t) = \sum_{m=0}^{8} s_k^{(m)} c_k^{(m)}(t - mT_k) \quad (1)$$

$$c_k^{(m)}(t) = \sum_{q=1}^{Q_k} d_k^{(m)}\{q\} p_{rrc}(t - qT_e) \quad (2)$$

where $s_k^{(m)} \in \{-1, +1\}$ designates the BMSK-modulated symbols. A spread code $c_k^{(m)}(t)$ for the m-th symbol of the subscriber station k is composed of $Q_k$ chips $d_k^{(m)}\{q\} \in \{-1, +1\}$ and has a length of $T_k = Q_k T_c$. The chip rate is assumed to be 4096 Mchips/s. The chip form $p_{rrc}(t)$ has a square root raised cosine spectrum where $\alpha = 0.22$. The chips $d_k^{(m)}\{q\}$ vary from symbol to symbol because they are produced by multiplying the q-th chip of a code with orthogonal variable spread factor (OVSF) of the k-th subscriber station by the $(mQ_k+q)$-th chip of a PN (pseudo-noise) scrambling code.

Data Model of the Downlink:

A channel with a plurality of discrete connection paths is assumed so that a channel pulse response $h_k^{(k',m)}(t)$ is defined by $$h_k^{(k',m)}(t) = \sum_{q=1}^{Q} h_{k,q}^{(k',m)} \delta(t - \tau_{k,q}) \quad (3)$$

where $\delta(t)$ indicates the Dirac function. Each coefficient (Tap) $h_{k,q}^{(k',m)} \in C$ of the channel pulse response is assigned to a connection path q via which the m-th symbol of the signal k' of the base station is transmitted to the subscriber station k.

The channel parameters which are estimated by the base station in the uplink are assumed to be reciprocal for the downlink with regard to the directions of incidence DOA (direction of arrival). $a_{k,q} \in C^{M,I}$ is a steering vector of the antenna device of the base station, M indicating the number of antenna elements. The averaged attenuation of the connection paths is designated by $p_{k,q} \in R$, and the delay time as $\tau_{k,q}$. The attenuations are numbered in ascending order so that $p_{k,I}$ is the path with the lowest attenuation.

The reciprocity does not however apply to the phase shift $\phi_{k,q}$. If the frequencies are the same for both transmission directions, as in the TDD (time division duplex) mode, this is also simplified. In the FDD mode, the frequencies of the transmission directions are however different. In a first exemplary embodiment it is proposed to transmit this phase shift $\phi_{k,q}$ from the subscriber station to the base station. Because the data rate in the uplink is as a rule lower than in the downlink, capacity should be available for it.

The base station can therefore calculate the q-th Tap of $h_k^{(k',m)}(t)$:

$$h_{k,q}^{(k',m)} = p_{k,q} a_{k,q}^H w_{k'}^{(m)} e^{j\phi_{k,q}}, \quad (4)$$

where $w_{k'}^{(m)} \in C^{M \times l}$ is the beam-forming vector of the base station for the k-th subscriber station which is to be estimated.

The channel pulse response changes from symbol to symbol, because a symbol-related beam formation is used. The change in the beam-forming vector w depends on the changing correlation properties of the scrambling codes, as explained below.

The subscriber stations use, as receiver, a RAKE demodulator with maximum ratio combination. The RAKE demodulator firstly estimates the channel pulse response $h_k^{(k,m)}(t)$. After the taps of the channel pulse response have been used to make the combination, the resulting signal is correlated with the individual spread code of the subscriber station k. A decision value u for the output signal of the RAKE demodulator k for the symbol m can be given by:

$$u_k^{(m)} = \text{Re}\left\{\sum_{k'=1}^{K} \sum_{q=1}^{Q} \sum_{f=1}^{N_f} CCF_{k,k'}^{(m)}(\tau_{k,f} - \tau_{k,q}) v_{k,f} p_{k,q} a_{k,q}^H w_{k'}^{(m)} s_{k'}^{(m)} e^{j\phi_{k,q}}\right\} \quad (5)$$

where K, Q and $N_f$ are the numbers of the subscribers stations, connection paths and RAKE fingers. CCF gives the cross-correlation function of the spread code of the subscriber station k and k' for the symbol m. The cross-correlation function corresponds to the auto-correlation function for k=k'. The weightings v of the RAKE fingers are derived from the channel pulse response:

$$\partial_{k,f} = E[(h_{k,f}^{(k,m)})^*] = E\left[p_{k,f}(w_{k'}^{(m)})^H a_{k,f} e^{-j\phi_{k,f}}\right], \quad (6)$$

where ( )* indicates the conjugate complex and E indicates an anticipated value.

Presetting of the RAKE Finger Weightings v:

Because symbol-related resetting of the beam formation is provided, the channel pulse response also changes. The RAKE demodulator of the subscriber station uses pilot symbols in signal sections for the channel estimation at the start of each time slot to estimate the channel pulse response $h_k^{(k,m)}(t)$.

In an exemplary embodiment with a radio interface in the TDD mode, this corresponds, during the pilot symbols, to the mid amble, the beam forming is kept constant. For this reason, only the correlation properties of the spread code are changed by the scrambling, while the channel pulse response remains the same. The resulting channel estimation of the RAKE demodulator is the mean value of the estimations over all the pilot symbols. The RAKE demodulator consequently estimates a constant channel with averaged correlation properties. The averaged correlation properties of the scrambling codes are ideal, i.e. the cross correlation is approximately zero and the auto-correlation corresponds to the spread factor for the time zero and is otherwise equal to zero. Only the connection paths of the RAKE fingers have to be taken into account in the channel estimation.

The beam-forming vector $w_k^{pilot}$ of the base station for the pilot symbols is determined in such a way that the power of the channel pulse response is maximized at the RAKE demodulator k, the transmit power $(w_k^{pilot})^H w_k^{pilot}$ for all the subscriber stations k being the same. As a result, the following optimization problem occurs:

$$\max_{w_k^{pilot}} \left\{ \sum_{f=1}^{N_f} (w_k^{pilot})^H a_{k,f} p_{k,f}^2 a_{k,f}^H w_k^{pilot} \right\} = \max_{w_k^{pilot}} \{(w_k^{pilot})^H A_k A_k^H w_k^{pilot}\} NB : (w_k^{pilot})^H w_k^{pilot} = 1 \quad (7)$$

where $A_t = (a_{k,1} P_{k,1}, \ldots a_{k,N_f} P_{k,N_f}) \in C^{M \times N_f}$ applies. The solution is the eigenvector for the greatest eigenvalue $A_k A_k^H$.

The resulting weight of the RAKE finger is obtained from:

$$v_{k,f} = p_{k,f} (w_k^{pilot})^H a_{k,f} e^{-j\phi_{k,f}} \quad (8)$$

Symbol-Related Beam Formation:

After the weightings v of the RAKE fingers have been determined during the transmission of the pilot symbols, the base station can calculate the beam-forming vector $w_k^{(m)}$ of the subscriber station k for each symbol m which gives rise to the requested decision value $u_k^{(m)}$ at the output of RAKE demodulator k. In addition, the possibility is used to reduce transmit power by the antenna gain of the antenna device.

For the sake of simplification, the following abbreviations are introduced:

$$z_k^{(m)} = s_k^{(m)} w_k^{(m)} \in C^{M \times 1}$$

and $$b_{k,q} = p_{k,q} a_{k,q} e^{-j\phi_{k,f}} \in C^{M \times 1}.$$

The decision value of the RAKE demodulator for the subscriber stations k can be given as $$u_k^{(m)} = Re \left\{ \sum_{k'=1}^{K} \sum_{q=1}^{Q} \sum_{f=1}^{N_f} CCF_{k,k'}^{(m)}(\tau_{k,f} - \tau_{k,q}) v_{k,f} b_{k,q}^H z_{k'}^{(m)} \right\} \quad (9)$$

After the vectors $z_{k'}^{(m)}$ are collected in a vector z(m) and transformed into a real form of representation, the following representation is produced for the decision value u of the RAKE demodulator:

$$u_k^{(m)} = \sum_{q=1}^{Q} \sum_{f=1}^{N_f} (\gamma_{k,f,q}^{(m)})^T x^{(m)} = (\gamma_k^{(m)})^T x^{(m)} \quad (10)$$

where $$x^{(m)} = [Re\{z^{(m)}\}^T, Im\{z^{(m)}\}^T]^T \in R^{2MK \times 1}$$

$$z^{(m)} = [(z_1^{(m)})^T, \ldots, (z_K^{(m)})^T]^T \in C^{MK \times 1}$$

and $$\gamma_k^{(m)} = \sum_{q=1}^{Q} \sum_{f=1}^{N_f} \gamma_{k,f,q}^{(m)} \in R^{2MK \times 1}$$

$$y_{k,f,q}^{(m)} = [Re\{g_{k,f,q}^{(m)}\}^T, Im\{g_{k,f,q}^{(m)}\}^T]^T \in R^{2MK \times 1}$$

where $$g_{k,f,q}^{(m)} = [CCF_{k,1}^{(m)}(\tau_{k,f} - \tau_{k,q}), \ldots, CCF_{k,K}^{(m)}(\tau_{k,f} - \tau_{k,q})]^T \otimes (v'_{k,f} b_{k,q}) \in C^{MK \times 1}$$

where $\otimes$ designates the Kronecker product.

The objective of the optimization is to adjust the decision value u to a predefined level for each RAKE demodulator, and K conditions must therefore be fulfilled. The number of degrees of freedom is greater than the number of conditions. The remaining degrees of freedom can be used to find a solution with reduced transmit power of the base station. The optimization problem is as follows:

$$\min_{x^{(m)}} \{\|x^{(m)}\|_2^2\} NB : \Gamma^{(m)} x^{(m)} = \theta \quad (11)$$

where $$\Gamma^{(m)} = [s_1^{(m)} \gamma_1^{(m)}, \ldots, s_K^{(m)} \gamma_K^{(m)}]^T \in R^{K \times 2MK}$$

and $$\theta = [\theta_1, \ldots, \theta_x]^T \in R_+^{K \times 1}.$$

the parameter $\theta_k \in R_+$ of the secondary condition of (11) is the absolute value of the requested decision value u of the RAKE demodulator k. The requested $\theta_k$ can be selected individually for each subscribed station k. Rapid regulation of the transmit power with TPC can easily be implemented by changing $\theta_k$ as a function of the TPC instruction.

The solution of the optimization problem of equation (11) can be given by $$x^{(m)} = (\Gamma^{(m)})^T (\Gamma^{(m)}(\Gamma^{(m)})^T)^{-1} \theta \quad (12)$$

It is easily possible to calculate the beam-forming vector w for more than one symbol; only additional secondary conditions for the other symbols have to be added in (11).

Exemplary Embodiments Without Phase Information in the Base Station:

The two variants without feedback with phase information use the above described presetting of the RAKE finger weightings v. The influence of the unknown phase shift is compensated by the use of suitable objective functions.

The first variant uses the signal-to-interference and signal-to-noise ratio $SINR_k$ of the output signal of the RAKE demodulator. The second variant is based on an assumption of the most unfavorable phase angle for the decision value u (worst case).

1st Variant: Consideration of Power

This variant divides the signal into a useful signal $S_k$, the interference by non-ideal auto-correlation properties of the spread code (ISI intersymbol interference) and the interference by non-ideal cross-correlation properties of the spread code (CCI co-channel interference).

The power of the useful signal corresponds to $$S_k^{(m)} = \left| \sum_{f=1}^{N_f} CCF_{k,k}^{(m)}(0) y_{k,f} p_{k,f} a_{k,f}^H w_k^{(m)} \right|^2 \quad (13)$$

where $y_{k,f} = v_{k,f} e^{-j\phi_{k,f}}$ is the weight of the RAKE finger v without the factor of the phase of the connection path.

For the power of the interference of the output signal of RAKE demodulator it is assumed that the proportions are added incoherently. Therefore:

$$I_k^{au,(m)} = \sum_{f=1}^{N_f} \sum_{q=1}^{Q} |CCF_{k,k}^{(m)}(\tau_{k,f} - \tau_{k,q}) y_{k,f} p_{k,q} a_{k,q}^H w_k^{(m)}|^2 \quad (14)$$

and CCI as $$I_k^{cr,(m)} = \sum_{k'=1, k' \neq k}^{K} \sum_{f=1}^{N_f} \sum_{q=1, q=f}^{Q} |CCF_{k,k'}^{(m)}(\tau_{k,f} - \tau_{k,q}) y_{k,f} p_{k,q} a_{k,q}^H w_{k'}^{(m)}|^2. \quad (15)$$

As a result, an optimization problem according to:

$$\min_{w_k^{(m)}} \left\{ \sum_{k=1}^{K} \|w_k^{(m)}\|_2^2 \right\}, \quad (16)$$
$$k = l_{\min} K$$

where NB: $S_k^{(m)} = \text{SINR}_k (I_k^{au,(m)} + I_k^{er,(m)} + N_k), k \approx 1, \ldots, K$ with Nk as the power of the noise and intercell interference.

2nd Variant: Consideration of Worst Case

In the most unfavorable case, the absolute value of the decision value u $$u_k^{(m)} = \sum_{f=1}^{N_f} \text{Re} \Bigg\{ CCF_{k,k}^{(m)}(0) v_{k,f} p_{k,f} a_{k,f}^H w_k^{(m)} - \quad (17)$$

$$\sum_{k=1}^{Q} \left| \sum_{k'=1}^{K} CCF_{k,k'}^{(m)}(\tau_{k,f} - \tau_{k,q}) v_{k,f} p_{k,q} a_{k,q}^H w_{k'}^{(m)} s_{k'}^{(m)} \right| \Bigg\}$$
$$k = f$$

resulting in an optimization problem corresponding to:

$$\min_{w_k^{(m)}} \left\{ \sum_{k=1}^{K} \|w_k^{(m)}\|_2^2 \right\} NB: u_k^{(m)} = \theta_k, k = 1, \ldots, K \quad (18)$$

for $\theta = (\theta_l, \ldots, \theta_k)^T \in R_+^{krl}$, see equation (11).

The bit error rate of a transmission with beam formation according to the method in accordance with the invention with feedback of the phase information leads to a bit error rate which is almost two orders of magnitude better than with conventional methods.

The derived beam-forming algorithm with symbol-related beam formation by an adaptive antenna device for the downlink to the individual subscriber stations is implemented in base station BS of the radio communication system. The sequence of the method which is described below relates to the transmission of the data from the base station BS to the subscriber station MS after the connection has already been terminated.

1. Parameter estimation of the directions of instance, attenuation values and delay times of the connection paths of the various subscriber stations which are assigned to the base station in the uplink. These estimated parameters constitute the basic position for the following steps of the beam formation in the downlink for the duration of a time slot.
2. The base station BS receives the phase information which is transmitted by the subscriber station MS and which has been calculated by the RAKE demodulator of the subscriber station MS on the basis of the channel estimation of the directly preceding time slot. The determination of the phase information does not constitute additional effort because the conventional RAKE demodulator already provides channel estimation. The subscriber station does not need to be changed.
3. Presetting of the RAKE finger weightings v during the pilot symbols of each time slot:
   a) Beam-forming vectors $w_k^{pilot}$ are calculated by the specified optimization in equation (7).
   b) Constant beam formation during the pilot symbols on the basis of the calculated beam-forming vector $w_k^{pilot}$.
4. This results in the predetermination of the RAKE finger weightings v by equation (8). The unknown phase shifts $\phi_{k,f}$ are replaced by the already received phase information of the subscriber station MS (see Point 2).
5. Combination of the known channel parameters per subscriber station MS and connection path in vector b.
6. Symbol-related calculation of the beam-forming vectors w for all the subscriber stations MS by the following steps:
   a) Calculation of the auto-correlation and cross-correlation of the scrambled spread code as a function of the path delay times known from the uplink.
   b) Combination of the beam-forming vectors w with the data symbols to be respectively transmitted in vector z.
   c) Real-value representation of the RAKE demodulator output variables in equation (10) as a function of the calculated auto-correlation and cross-correlation, as well as the combined channel parameters and beam-forming vectors b and z.
   d) Definition of the requested RAKE demodulator output values in vector $\theta_k$. The selection of the entries $\theta_k$ is carried out in accordance with the interference to be expected due to noise and intercell interference. The TPC (Transmission Power Control) can be implemented for an adaptive setting of the entries.
   e) Calculation of the combined beam-forming vectors by equation (12).

Alternative symbol-related calculation of the beam-forming vectors w for the subscriber stations without knowledge of the phase information (no feedback, Steps 2, 5 and 6 are omitted).

Two possible alternatives:

a) Consideration of power:

Substitution of signal power at the RAKE demodulator output, the power of the intersymbol interference and the channel crosstalk power in equations (13)–(15). Calculation of the beam-forming vectors in equation (16).

b) Consideration of worst case:

Substitution of the RAKE demodulator output variables in equation (17) for the worst case of the unknown phase information. Calculation of the beam-forming vectors in equation (18).

The beam-forming vectors v are calculated in a digital signal processing device of the base station BS. To do this, the signal processing unit evaluates measured values of the antenna elements of the antenna device AE in relation to received signals. After amplification, base band transmission and analog/digital conversion, digitized input values of the received signals are made available to the digital signal processing device. These input values and further connection-specific parameters (transmit power, TPC) and programs for carrying out the algorithms are stored in a storage unit.

The beam formation on the basis of the beam-forming vectors v for the transmit signals is carried out in a base station BS with a network for beam formation according to, for example, DE 197 37 365. The transmit signals of the antenna elements are transmitted in the same frequency band (identical transmit frequency, if appropriate time slot and/or code) and together result in spatial separation.

The invention claimed is:

1. A method for forming beams in a radio station of a radio communications system having an antenna device with a plurality of antenna elements, the radio station being connected to another radio station via a radio interface and determining, from transmissions of the other radio station, transmission variables for at least one connection path, said method comprising:

transmitting to the other radio station a transmit signal with signal sections used by the other radio station for channel estimation;

setting, during the signal sections for the channel estimation, a constant beam-forming vector from the transmission variables for at least one transmission path;

estimating a reception characteristic of the other radio station for the signal sections for channel estimation; and determining a symbol-related beam-forming vector outside the signal sections for channel estimation, which beam-forming vector takes into account variable, symbol-related properties of the transmit signal.

2. The method as claimed in claim 1, wherein the radio interface is in accordance with a CDMA transmission method.

3. The method as claimed in claim 1, wherein the signal sections for channel estimation of the other radio are known pilot symbols.

4. The method as claimed in claim 1, wherein the other radio station is a subscriber station with a RAKE demodulator, and the reception characteristic is estimated as weightings of RAKE fingers.

5. The method as claimed in claim 1, wherein the variable, symbol-related properties of the transmit signal are at least one of auto-correlation and cross-correlation properties of spread codes used for the transmit signal.

6. The method as claimed in claim 1, wherein the transmission variables for at least one connection path are direction of instance, attenuation and delay times.

7. The method as claimed in claim 1, wherein said determining includes optimizing the symbol-related beam-forming vector so that a predefined decision value of a detection result occurs at the other radio station and a low transmit power is required.

8. The method as claimed in claim 1, wherein said determining of the symbol-related beam-forming vector is performed per symbol or per symbol group.

9. The method as claimed in claim 1, further comprising receiving from the other radio station phase information relating to the individual connection paths, and wherein said estimating of the reception characteristic of the other radio station takes into account the phase information.

10. The method as claimed in claim 1, further comprising estimating a signal power, an intersymbol interference power and a channel crosstalk power for the other radio station; and wherein said determining includes optimizing the symbol-related beam-forming vector to produce a minimum required transmit power.

11. The method as claimed in claim 1, further comprising estimating a decision value, using a predefined threshold, of a detection result in the other radio station under unfavorable phase conditions, and wherein said determining includes optimizing the symbol-related beam-forming vector to a minimum required transmit power based on the decision value.

12. A base station, coupled to an antenna device with a plurality of antenna elements, for communicating with a radio station via a radio interface, said base station comprising:

a transmitter to send to the other radio station a transmit signal with signal sections used by the other radio station for channel estimation; and a digital signal-processing device to determine transmission variables for at least one connection path from transmissions of the radio station, to set, during the signal sections for the channel estimation, a constant beam-forming vector from the transmission variables for at least one transmission path, to estimate a reception characteristic of the other radio station for the signal sections for channel estimation, and to determine a symbol-related beam-forming vector outside the signal sections for channel estimation, which beam-forming vector takes into account variable, symbol-related properties of the transmit signal.

* * * * *